T. E. MURRAY.
VEHICLE WHEEL.
APPLICATION FILED DEC. 14, 1916.
1,230,016. Patented June 12, 1917.
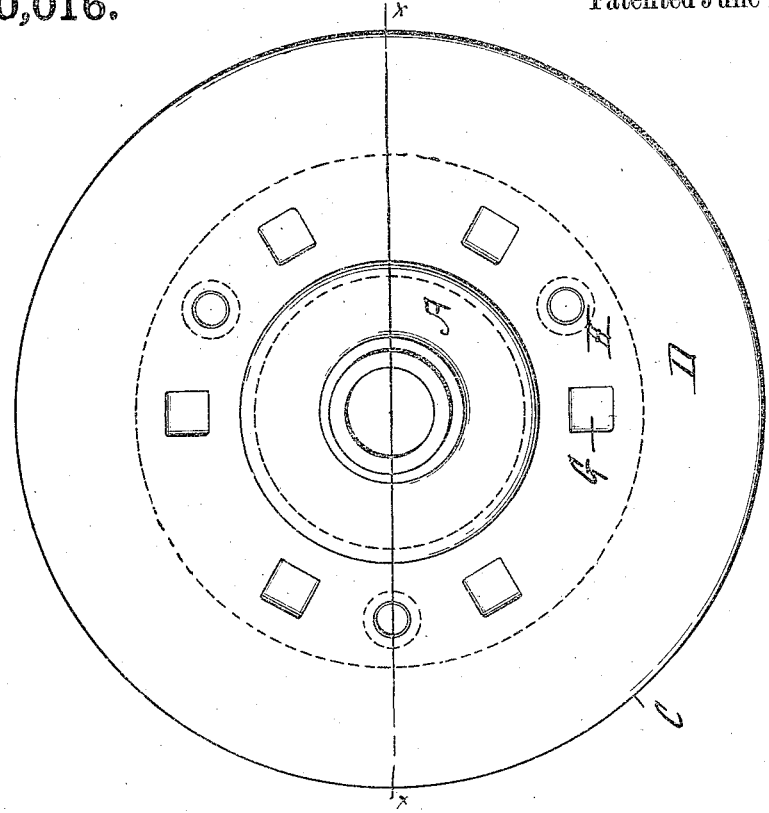
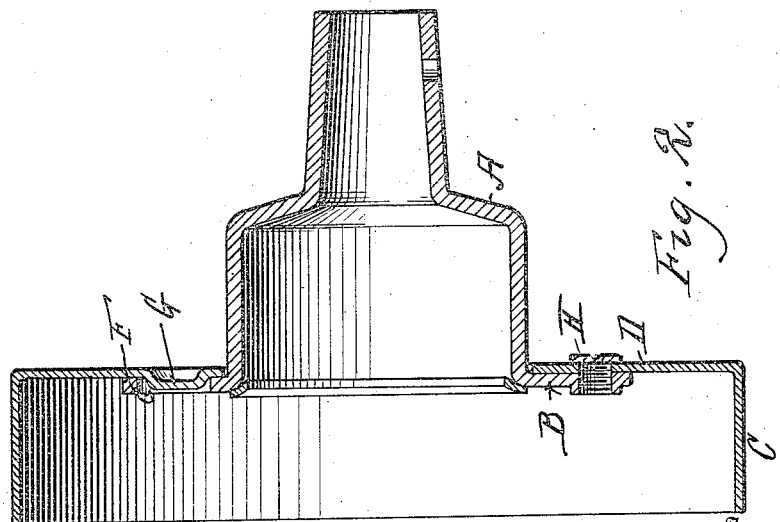
Inventor
Thomas E. Murray
By his Attorney

UNITED STATES PATENT OFFICE.

THOMAS E. MURRAY, OF NEW YORK, N. Y.

VEHICLE-WHEEL.

1,230,016.

Specification of Letters Patent.

Patented June 12, 1917.

Application filed December 14, 1916. Serial No. 136,862.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels, and consists more particularly in the construction of the means for connecting together the wheel hub and a brake drum.

In the accompanying drawings—

Figure 1 is a face view of my hub and brake drum, and Fig. 2 is a section on the line $x$, $x$ of Fig. 1.

Similar letters of reference indicate like parts.

A is the hub, having on its inner edge a flange B. C is the brake drum having a central opening for the reception of the hub, so that the hub flange bears against the inner side of the drum face D. Through said flange I form openings F to receive struck up projections G formed on the drum face D, and through said flange and said drum face, I form threaded openings to receive correspondingly threaded bolts H. The bolts clamp the flange B and drum face D together, and prevent any longitudinal movement of the hub with reference to the drum face. The bolts H and projections G unitedly transmit the rotary motion of said hub to said brake drum.

I claim:

1. A brake drum, having in its face a central opening, a hub seated in said opening, a flange on said hub bearing against the rear side of said drum face and having openings, struck up projections on said drum face entering said flange openings, and means for clamping together said drum face and said flange.

2. A brake drum, having in its face a central opening, a hub seated in said opening, a flange on said hub bearing against the rear side of said drum face and having openings, struck up projections on said drum face entering said flange openings, and bolts passing through said drum face and said flange.

In testimony whereof I have affixed my signature in presence of two witnesses.

THOMAS E. MURRAY.

Witnesses:
GERTRUDE T. PORTER,
MAY T. MCLARRY.

Copies of this patent may be obtained for five cents each, by addressing the "Commissioner of Patents, Washington, D. C."